CLOSE CELL POLYURETHANE FOAM

INVENTOR.
Robert B. Nissley
BY Polachek & Saulsbury
ATTORNEYS.

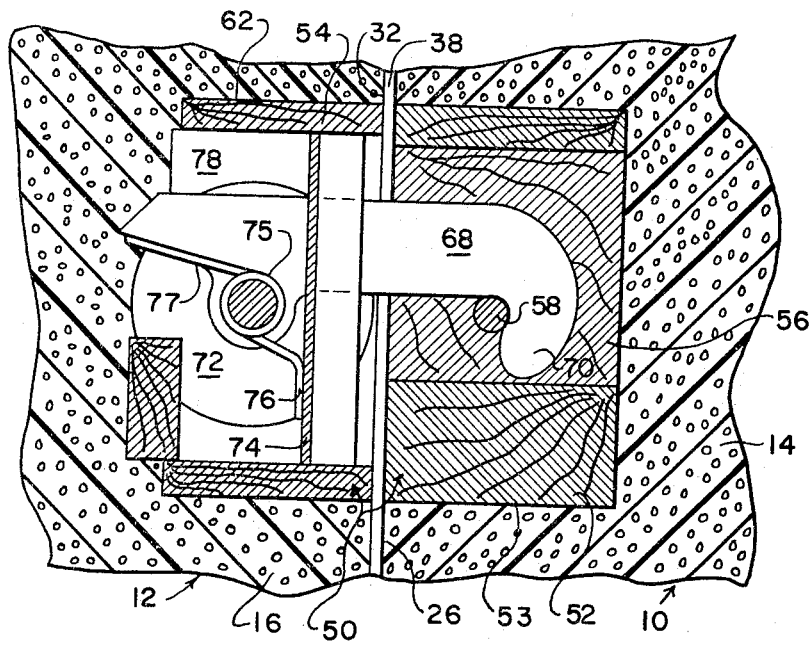
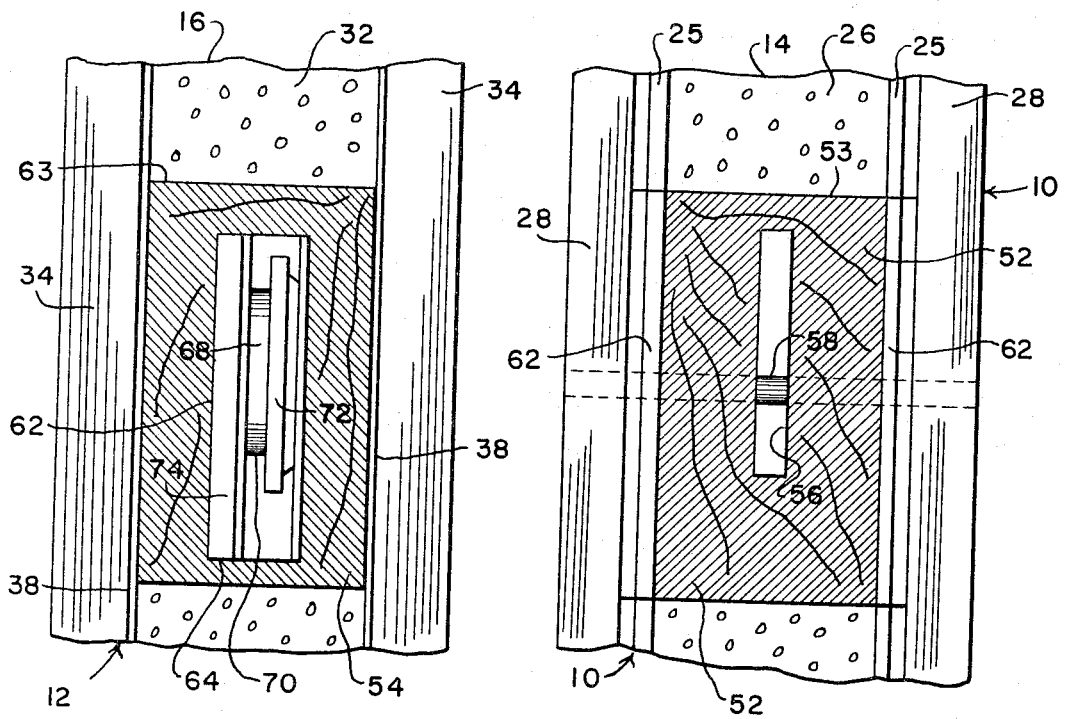

United States Patent Office 3,327,447
Patented June 27, 1967

3,327,447
INTERLOCKING JOINT FOR ABUTTED EDGES
OF INSULATED PANEL SECTIONS
Robert B. Nissley, Ridgefield, Conn. (% Traulsen & Co., Inc., 114—02 15th Ave., College Point, N.Y. 11356)
Filed Apr. 22, 1965, Ser. No. 449,942
8 Claims. (Cl. 52—582)

ABSTRACT OF THE DISCLOSURE

An interlocking joint for abutted edges of insulated panels. The joint comprises a flat expanded cellular plastic body with exposed edge, a pair of thin metal sheets having flange portions bent over marginal portion of said edge, the edge having narrow, deep grooves therein in spaced parallel relationship for receiving in sealing relation lips protruding from an edge of another insulated panel, the flange portions terminating at said grooves, and disposed for contacting in face-to-face abutment similar flange portions at the edge of the other panel, at least one rigid block seated in a recess in the exposed edge of the body, the block having an aperture, and a pin extending transversely of said aperture for engaging a tongue of another block seated in the exposed edge of the other panel, the block having other grooves aligned with the first named groove for receiving said lips in sealing relation.

---

This invention concerns a novel interlocking joint for abutted edges of insulated panels.

The invention is particularly applicable to panels made of expanded closed cell polyurethane foam covered on opposite sides with sheet metal, as conventionally used for walls of large refrigerators, freezers and the like. Heretofore considerable difficulty has been experienced in connecting two or more panels together in an air-tight, simple, durable joint. Many complex devices including brackets, joining plates and the like have been proposed, but all have one or more objectionable features. The present invention is directed at overcoming the above and other difficulties in a simplified and more effective manner.

According to the invention two facing edges of two panels which are to be abutted are treated so as to interfit and to interlock with each other. One edge of a first panel is formed with straight, parallel, spaced kerfs or grooves formed in the cellular plastic material, with parts of the one edge covered with first narrow sheet metal flanges. The facing edge of a second panel to be joined to the first panel is formed with protruding lips which enter the kerfs in the one edge in sealing relationship. Adjacent to the lips are other sheet metal flanges which abut the the first narrow sheet metal flanges of the first panel. In the edge of the second panel is at least one block in which is a latch having a protruding tongue. This tongue engages on a transverse pin in another block mounted in the edge of the first panel. The outer edge of the block in the first panel is grooved to receive the lips of the second panel. By the arrangement described the two panels are held together in edgewise abutted sealing relationship.

It is therefore one object of the invention to provide insulated panels with an improved interlocking butt joining joint construction.

A further object is to provide edges of two abutted panels having bodies formed of expanded plastic material covered by sheet metal, with kerfs in the body of one panel, and with metal tongues protruding from the other panel and engaging in the kerfs.

Another object is to provide a joint construction as described with blocks in the plastic bodies of the panels having interengaging locking parts.

For further comprehension of the invention, and of the objects and advantages thereof, reference will be had to the following description and accompanying drawings, and to the appended claims in which the various novel features of the invention are more particularly set forth.

Figure 1:
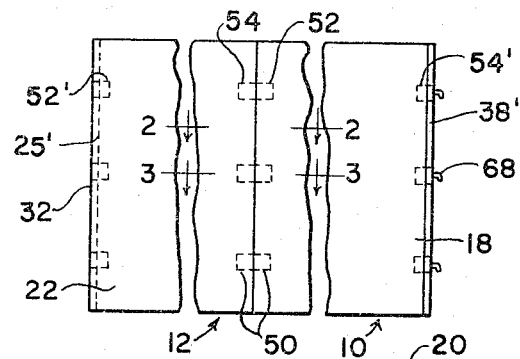
Figure 2:
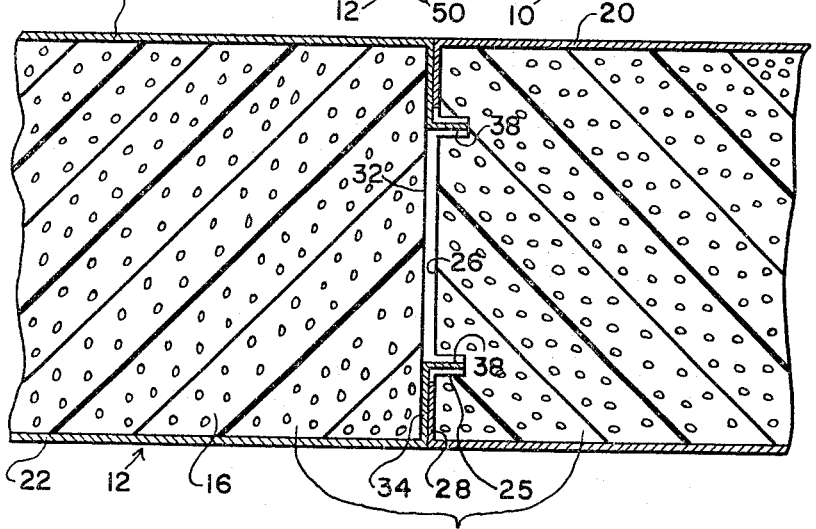
Figure 3:
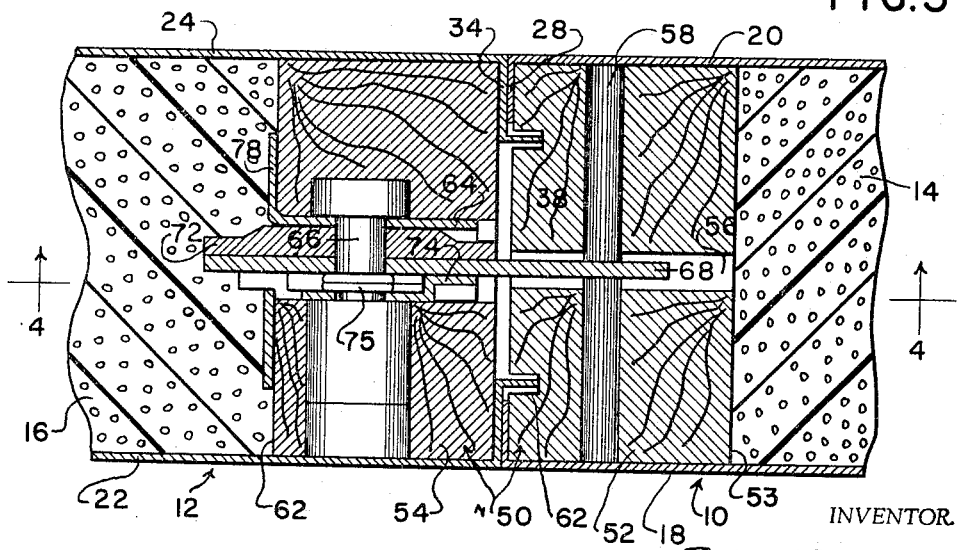

In the accompanying drawings forming a material part of this disclosure:

FIGURE 1 is a front elevational view on a reduced scale, with parts broken away, of two panels embodiying the invention, FIG. 2 is an enlarged fragmentary sectional view taken on line 2—2 of FIG. 1, FIG. 3 is an enlarged fragmentary sectional view taken on line 3—3 of FIG. 1, FIG. 4 is a sectional view taken on line 4—4 of FIG. 3, and FIG. 5 and FIG. 6 are fragmentary edgewise elevational views of the two panels respectively of FIGS. 1–4.

Referring to the drawing, there are shown two insulated panels 10, 12. Panel 10 has a flat rectangular body 14 formed of expanded closed cell polyurethane material. Panel 12 has a similar cellular body 16. On opposite sides of panel 10 is a skin formed of thin metal plates or sheets 18, 20. On opposite sides of panel 12 is a skin formed of other thin metal sheets or plates 22, 24.

In panel 10 as clearly shown in FIGS. 2 and 6 are formed two long grooves or kerfs 25 spaced apart. The grooves are formed in the exposed outer edge 26 of the cellular body 14. The metal sheets 18 and 20 are bent around to abut the edge 26 and define two long, flat coplanar flanges 28 which terminate just short of the grooves 25.

In panel 12 as shown in FIGS. 2 and 5, the metal sheets 22, 24 are bent around exposed edge 32 of panel body 16 to form two narrow flanges 34. Two narrow lips 38 protrude outwardly from edge 32 at inner edges of flanges 34. The lips 38 are spaced apart a distance equal to the spacing of grooves 25 so that the lips fit into these grooves in sealing relationship with inner ends 39 of the grooves. The flanges 34 abut flanges 28 in face-to-face sealing relationship. A narrow dead air space 35 which has thermal insulating properties is defined between facing edges 26 and 32 of the ecllular bodies 14 and 16.

The panels may be provided with a plurality of spaced locking assemblies 50 as indicated by dotted lines in FIG. 1. Each locking assembly includes two wooden blocks 52, 54. Block 52 is embedded in a cavity 53 formed in edge 26 of panel body 14. In the block 52 is a centrally located narrow aperture 56. A metal pin 58 extends across aperture 56. The pin is spaced from upper and lower faces 59, 60 of aperture 56; see FIGS. 4 and 6. Two grooves 62 are formed in block 52 in alignment with grooves 25 to receive the lips 38 of the panel 12.

Block 54 is embedded in recess 63 formed in edge 32 of panel body 16. Block 52 faces block 52. In the block 54 is an aperture 64. A bolt 66 extends transversely through aperture 64 and pivotally carries a tongue 68 having a hook 70 on its end extended outside of block 54 and edge 32. The tongue 68 engages on cross pin 58 in block 52; see FIG. 4. Guide plates 72, 74 on opposite sides of the flat tongue 68 guide it in rotational movement. On bolt 66 is a coil spring 75 which has ends 76, 77 engaged on the plate 74 and tongue 68 to bias the tongue in a clockwise direction as viewed in FIG. 4 so that the tongue 68 remains engaged on pin 58. Plate 78 holds plates 72, 74 in aperture 64.

When the two panels 10, 12 shown separated in FIGS. 5 and 6 are abutted in edgewise relationship as shown in FIGS. 1–4, the lips 38 enter the grooves 25 and 62 in sealing relationship, and in addition the hooks 70 of tongues 68 of all locking assemblies 50 snap over the pins 58 and securely engage them. The two panels are thus locked together in hermetic sealing seal relationship. The butt joint is strong, secure, simple and permanent. The rigidly joined panels can be used as walls of walk-in refrigerators and in other similar applications.

It will be apparent that the outer edge of panel 10 can be formed like edge 32 of panel 12 with two protruding lips 38' as illustrated in FIG. 1. Similarly outer edge 32' of panel 12 can be formed with kerfs or grooves 25' like grooves 25 of panel 10. In this way a plurality of panels may be joined together in edgewise abutment. Further blocks 52', 54' similar to blocks 52 and 54 respectively, will be provided in the outer edges of panels 10, 12 to lock further panels together in edgewise abutment.

While I have illustrated and described the preferred embodiments of my invention, it is to be understood that I do not limit myself to the precise constructions herein disclosed and that various changes and modifications may be made within the scope of the invention as defined in the appended claims.

Having thus described the invention, what I claim as new, and desire to secure by United States Letters Patent is:

1. An insulated panel having an improved joint construction, comprising a flat expanded cellular plastic body, a pair of thin metal sheets covering opposite sides of said body, said body having an exposed edge, said sheets having flange portions bent over marginal portions of said edge, said edge having narrow, deep grooves formed therein in spaced parallel relationship for receiving in sealing relationship lips protruding from an edge of another insulated panel, said flange portions terminating at said grooves, and disposed for contacting in face-to-face abutment similar flange portions at the edge of the other panel; at least one rigid block seated in a recess in the exposed edge of said body, said block having an aperture therein, and a pin extending transversely of said aperture for engaging a tongue of another block seated in the exposed edge of the other panel, said first named block having other grooves aligned with the first named grooves for receiving said lips in sealing relationship.

2. An insulated panel having an improved joint construction, comprising a flat expanded cellular plastic body, a pair of thin metal sheets covering opposite sides of said body, said body having an exposed edge, said sheets having flange portions bent over marginal portions of said edge, said edge having narrow, deep grooves formed therein in spaced parallel relationship for receiving in sealing relationship lips protruding from an edge of another insulated panel, said flange portions terminating at said grooves, and disposed for contacting in face-to-face abutment similar flange portions at the edge of the other panel; at least one rigid block seated in a recess in the exposed edge of said body, said block having an aperture therein, and a pin extending transversely of said aperture for engaging a tongue of another block seated in the exposed edge of the other panel, said first named block having other grooves aligned with the first named grooves for receiving said lips on sealing relationship; said sheets being extended and bent over marginal portions of another edge of said body to define other flange portions for contacting in face-to-face abutment similar flange portions at a further edge of a third panel, said other flange portions terminating in outwardly extending parallel lips for engaging in other grooves in said further edge of said third panel.

3. An insulated panel assembly having an improved joint construction, comprising a first panel having a flat expanded cellular plastic first body, a first pair of thin metal sheets covering opposite sides of said body, said body having an exposed first edge, said sheets having first flange portions bent over marginal portions of said edge, said edge having narrow, deep grooves formed therein in spaced parallel relationship, said flange portions terminating at said grooves; a second panel having a second flat expanded cellular plastic body, a second pair of thin metal sheets covering opposite sides of said second body, said second body having an exposed second edge, said second sheets having second flange portions bent over marginal portions of said second edge and abutting the first flange portions, and parallel lips extending outwardly of inner edges of the second flange portions and disposed in said grooves in sealing relationship therewith, a first rigid block seated in a first recess in said first edge of the first cellular plastic body, said block having a first aperture therein, and a pin extending transversely of said aperture, said block having spaced parallel grooves in its outer side aligned with the grooves in the first edge of the first body and receiving said lips in sealing relationship; and a second rigid block seated in a second recess in the second edge of the second body, said second block having a second aperture therein, a spring biased tongue pivotally mounted in said second aperture and extending outwardly of said second block, said tongue having a hook at its end engaged on said pin, whereby the two panels are locked together in hermetic sealing relationship.

4. An insulated panel having an improved joint construction, comprising a flat expanded cellular plastic body, a pair of thin metal sheets covering opposite sides of said body, said body having an exposed edge, said sheets having flange portions bent over marginal portions of said edge, said edge having narrow, deep grooves formed therein in spaced parallel relationship for receiving in sealing relationship lips protruding from an edge of another insulated panel, said flange portions terminating at said grooves, and disposed for contacting in fact-to-face abutment similar flange portions at the edge of the other panel; at least one rigid block seated in a recess in the exposed edge of said body, said block having an aperture therein, and a pin extending transversely of said aperture for engaging a tongue of another block seated in the exposed edge of the other panel, said block having other grooves aligned with the first named grooves for receiving said lips in sealing relationship; said sheets being extended and bent over marginal portions of another edge of said body to define other flange portions for contacting in face-to-face abutment similar flange portions at a further edge of a third panel, said other flange portions terminating in outwardly extending parallel lips for engaging in other grooves in said further edge of said third panel and another rigid block seated in another recess in the other edge of said body, said other block having another aperture therein, a spring biased tongue pivotally mounted in said second aperture and extending outwardly of said other block for engaging on a pin in a block mounted in said further edge of said third panel.

5. An insulated panel assembly having an improved joint construction, comprising a first panel having a flat expanded cellular plastic first body, a first pair of thin metal sheets covering opposite sides of said body, said body having an exposed first edge, said sheets having first flange portions bent over marginal portions of said edge, said edge having narrow, deep grooves formed therein in spaced parallel relationship, said flange portions terminating at said grooves; a second panel having a second flat expanded cellular plastic body, a second pair of thin metal sheets covering opposite sides of said second body, said second body having an exposed second edge, said second sheets having second flange portions bent over marginal portions of said second edge and abutting the first flange portions, and parallel lips extending outwardly of inner edges of the second flange portions and disposed in said grooves in sealing relationship therewith, a first rigid block seated in a first recess in said first edge of the first cellular plastic body, said block having a first aperture therein, and a pin extending transversely of said aperture, said block having spaced parallel grooves in its outer side aligned with the grooves in the first edge of the first body and receiving said lips in sealing relationship; and a second rigid block seated in a second recess in the second edge of the second body, said second block having a second aperture therein, a spring biased tongue pivotally mounted in said second aperture and extending outwardly of said second block, said tongue having a hook at its end engaged on said pin, whereby the two panels are locked together in hermetic sealing relationship, the metal sheets of the first body being extended and bent over another edge of the first body to define a third pair of flange portions for contacting in face-to-face abutment a fourth pair of flange portions at a further edge of a third insulated panel, said third flange portions terminating in outwardly extending parallel other lips for engaging in other grooves in said further edge of the third panel.

6. An insulated panel assembly having an improved joint construction, comprising a first panel having a flat expanded cellular plastic first body, a first pair of thin metal sheets covering opposite sides of said body, said body having an exposed first edge, said sheets having first flange portions bent over marginal portions of said edge, said edge having narrow, deep grooves formed therein in spaced parallel relationship, said flange portions terminating at said grooves; a second panel having a second flat expanded cellular plastic body, a second pair of thin metal sheets covering opposite sides of said second body, said second body having an exposed second edge, said second sheets having second flange portions bent over marginal portions of said second edge and abutting the first flange portions, and parallel lips extending outwardly of inner edges of the second flange portions and disposed in said grooves in sealing relationship therewith, a first rigid block seated in a first recess in said first edge of the first cellular plastic body, said block having a first aperture therein, and a pin extending transversely of said aperture, said block having spaced parallel grooves in its outer side aligned with the grooves in the first edge of the first body and receiving said lips in sealing relationship; and a second rigid block seated in a second recess in the second edge of the second body, said second block having a second aperture therein, a spring biased tongue pivotally mounted in said second aperture and extending outwardly of said second block, said tongue having a hook at its end engaged on said pin, whereby the two panels are locked together in hermetic sealing relationship, the metal sheets of the first body being extended and bent over another edge of the first body to define a third pair of flange portions for contacting in face-to-face abutment a fourth pair of flange portions at a further edge of a third insulated panel, said third flange portions terminating in outwardly extending parallel other lips for engaging in other grooves in said further edge of the third panel, the metal sheets of the second body being extended and bent over another edge of the second body to define a fifth pair of flange portions thereat, said other edge of the second body having grooves therein located near said fifth flange portions respectively for receiving further protruding parallel lips of a fourth insulated panel.

7. An insulated panel assembly having an improved joint construction, comprising a first panel having a flat expanded cellular plastic first body, a first pair of thin metal sheets covering opposite sides of said body, said body having an exposed first edge, said sheets having first flange portions bent over marginal portions of said edge, said edge having narrow, deep grooves formed therein in spaced parallel relationship, said flange portions terminating at said grooves; a second panel having a second flat expanded cellular plastic body, a second pair of thin metal sheets covering opposite sides of said second body, said second body having an exposed second edge, said second sheets having second flange portions bent over marginal portions of said second edge and abutting the first flange portions, and parallel lips extending outwardly of inner edges of the second flange portions and disposed in said grooves in sealing relationship therewith, a first rigid block seated in a first recess in said first edge of the first cellular plastic body, said block having a first aperture therein, and a pin extending transversely of said aperture, said block having spaced parallel grooves in its outer side aligned with the grooves in the first edge of the first body and receiving said lips in sealing relationship; and a second rigid block seated in a second recess in the second edge of the second body, said second block having a second aperture therein, a spring biased tongue pivotally mounted in said second aperture and extending outwardly of said second block, said tongue having a hook at its end engaged on said pin, whereby the two panels are locked together in hermetic sealing relationship, the metal sheets of the first body being extended and bent over another edge of the first body to define a third pair of flange portions for contacting in face-to-face abutment a fourth pair of flange portions at a further edge of a third insulated panel, said third flange portions terminating in outwardly extending parallel other lips for engaging in other grooves in said further edge of the third panel, the metal sheets of the second body being extended and bent over another edge of the second body to define a fifth pair of flange portions thereat, said other edge of the second body having grooves therein located near said fifth flange portions respectively for receiving further protruding parallel lips of a fourth insulated panel; a third rigid block seated in a recess in the other edge of the first panel, said third block having a third aperture therein, a spring biased second tongue pivotally mounted in said third aperture and extending outwardly of the third block for engaging on a pin in a block seated in said further edge of the third panel.

8. An insulated panel assembly having an improved joint construction, comprising a first panel having a flat expanded cellular plastic first body, a first pair of thin metal sheets covering opposite sides of said body, said body having an exposed first edge, said sheets having first flange portions bent over marginal portions of said edge, said edge having narrow, deep grooves formed therein in spaced parallel relationship, said flange portions terminating at said grooves; a second panel having a second flat expanded cellular plastic body, a second pair of thin metal sheets covering opposite sides of said second body, said second body having an exposed second edge, said second sheets having second flange portions bent over marginal portions of said second edge and abutting the first flange portions, and parallel lips extending outwardly of inner edges of the second flange portions and disposed in said grooves in sealing relationship therewith, a first rigid block seated in a first recess in said first edge of the first cellular plastic body, said block having a first aperture therein, and a pin extending transversely of said aperture, said block having spaced parallel grooves in its outer side aligned with the grooves in the first edge of the first body and receiving said lips in sealing relationship; and a second rigid block seated in a second recess in the second edge of the second body, said second block having a second aperture therein, a spring biased tongue pivotally mounted in said second aperture and extending outwardly of said second block, said tongue having a hook at its end engaged on said pin, whereby the two panels are locked together in hermetic sealing relationship, the metal sheets of the first body being extended and bent over another edge of the first body to define a third pair of flange portions for contacting in face-to-face abutment a fourth pair of flange portions at a further edge of a third insulated panel, said third flange portions terminating in outwardly extending parallel other lips for engaging in other grooves in said further edge of the third panel, the metal sheets of the second body being extended and bent over another edge of the second body to define a fifth pair of flange portions thereat, said other edge of the second body having grooves therein located near said fifth flange portions respectively for receiving further protruding parallel lips of a fourth insulated panel; a third rigid block seated in a recess in the other edge of the first panel, said third block having a third aperture therein, a spring biased second tongue pivotally mounted in said third aperture and extending outwardly of the third block for engaging on a pin in a block seated in said further edge of the third panel; and a fourth rigid block seated in a further recess in the other edge of the second panel said fourth block having a fourth aperture therein, and a pin extending across said fourth aperture for receiving a tongue in a block seated in an exposed edge of said fourth panel, said fourth block having grooves therein aligned with the grooves in the other edges of the said second body for receiving the protruding lips of the fourth panel.

References Cited
UNITED STATES PATENTS

| | | | |
|---|---|---|---|
| 2,142,305 | 1/1939 | Davis | 52—593 X |
| 2,647,287 | 8/1953 | Jones | 52—582 |
| 2,741,341 | 4/1956 | Anderson | 287—20.927 |
| 3,000,144 | 9/1961 | Kitson | 52—593 |
| 3,113,401 | 12/1963 | Rose | 52—593 |
| 3,280,522 | 10/1966 | Palfey | 52—127 |

JOHN E. MURTAGH, *Primary Examiner.*